Oct. 3, 1933.   C. G. STRANDLUND   1,928,955
PLOW
Filed Sept. 20, 1929   3 Sheets-Sheet 1

WITNESS
Walter Ackerman

INVENTOR
Carl G. Strandlund
BY Brown, Jackson, Boettcher & Dienner
ATTORNEYS

Oct. 3, 1933.  C. G. STRANDLUND  1,928,955
PLOW
Filed Sept. 20, 1929   3 Sheets-Sheet 2

WITNESS
Walter Ackerman

INVENTOR
Carl G. Strandlund
BY
Brown, Jackson, Boettcher & Dienner
ATTORNEYS

Oct. 3, 1933.  C. G. STRANDLUND  1,928,955
PLOW
Filed Sept. 20, 1929   3 Sheets-Sheet 3

WITNESS
Walter Ackman

INVENTOR
Carl G. Strandlund
BY Brown, Jackson, Boettcher & Dienner
ATTORNEYS

Patented Oct. 3, 1933

1,928,955

UNITED STATES PATENT OFFICE 1,928,955

PLOW

Carl G. Strandlund, Moline, Ill., assignor to Deere & Company, Moline, Ill., a corporation of Illinois Application September 20, 1929
Serial No. 393,895

36 Claims. (Cl. 97—73)

The present invention relates to plows, and more particularly to power lift plows.

One of the general objects of the invention is to provide an improved construction of power lift mechanism which functions to raise the plow to substantially the same height irrespective of the depth adjustment at which the plow is operating. In most plows employing a power lift mechanism, the height to which the plow is lifted varies with the depth adjustment at which the plow is operating, the height of lift being proportionately low for a deep plowing depth, which is frequently objectionable because the plow fails to clear obstructions in being turned at the end of the field. In this regard, it is one of the particular objects of the invention to provide power lift mechanism of the above description which is rapidly acting in its operation and which starts to lift the plow almost immediately with the tripping of the lift clutch at all plowing depths at which the plow may be operating.

Such enables the plowing operation to be carried up closer to the fence line at the end of the field.

A further object of the invention is to provide improved depth adjusting mechanism of a type cooperating with the above described power lift mechanism in permitting the plow to be raised to the same transport height irrespective of the setting of this depth adjusting mechanism. One of the features of this depth adjusting mechanism is the provision of improved means by which the working range of adjustment may be readily varied. That is to say, by reversing the position of one of the stop members of such mechanism, one or the other of the limits of adjustment may be shifted to more readily adapt the plow to shallow plowing or to deep plowing.

A further object of the invention is to provide improved means operative between the axle of the land wheel and the axle of the front furrow wheel for leveling the plow.

Still another object of the invention is to provide an improved arrangement and construction of stop means for limiting the plow lifting movement of the land wheel crank axle, whereby the crank portion of this axle is prevented from passing beyond a substantially vertical position.

Other objects and advantages of the invention will appear from the following detail description of a preferred embodiment thereof:—

In the accompanying drawings illustrating such embodiment:—

Fig. 5 is a fragmentary view of part of the depth adjusting mechanism, showing the stop sleeve thereof in an alternative position;

Figure 1:
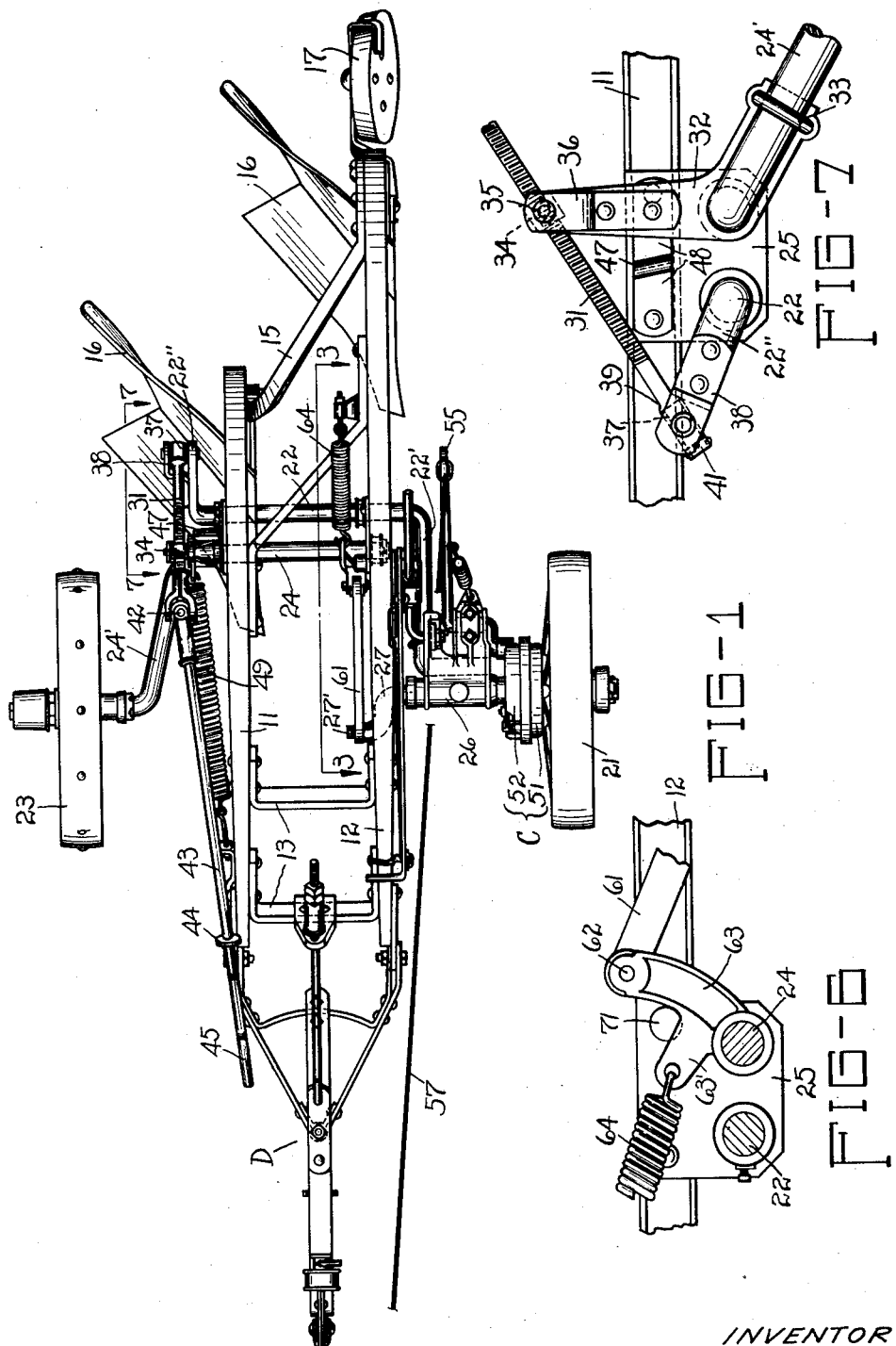
Fig. 1 is a plan view of the plow.
Figure 3:
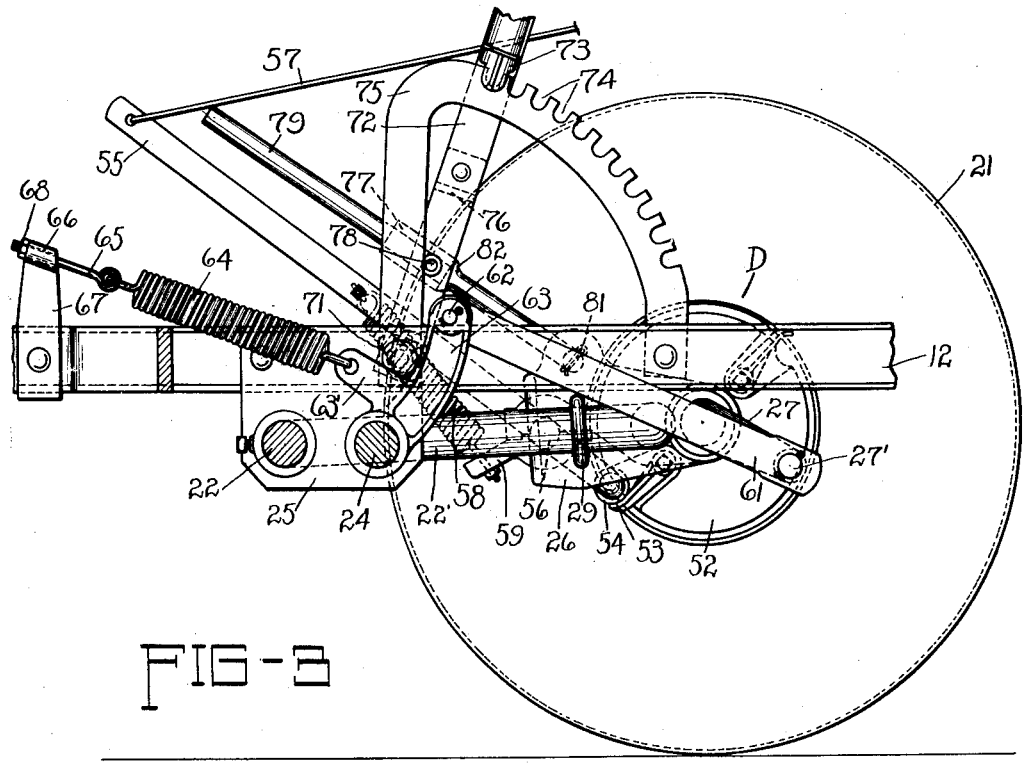
Fig. 3 is a cross sectional view along the line 3—3 of Fig. 1 showing the position of the power lift and depth adjusting parts when the plow is lowered to its greatest working depth.

Fig. 6 is a fragmentary view showing the swinging stop arm of the lift mechanism engaging against the fixed stop on the frame, corresponding to the position of these parts illustrated in Fig. 3; and Fig. 7 is a fragmentary view looking in the direction of the arrows 7—7 of Fig. 1, showing the leveling mechanism for the plow and also the stop means for preventing the land wheel crank axle from rotating back under the plow beyond a vertical position.

Figure 2:
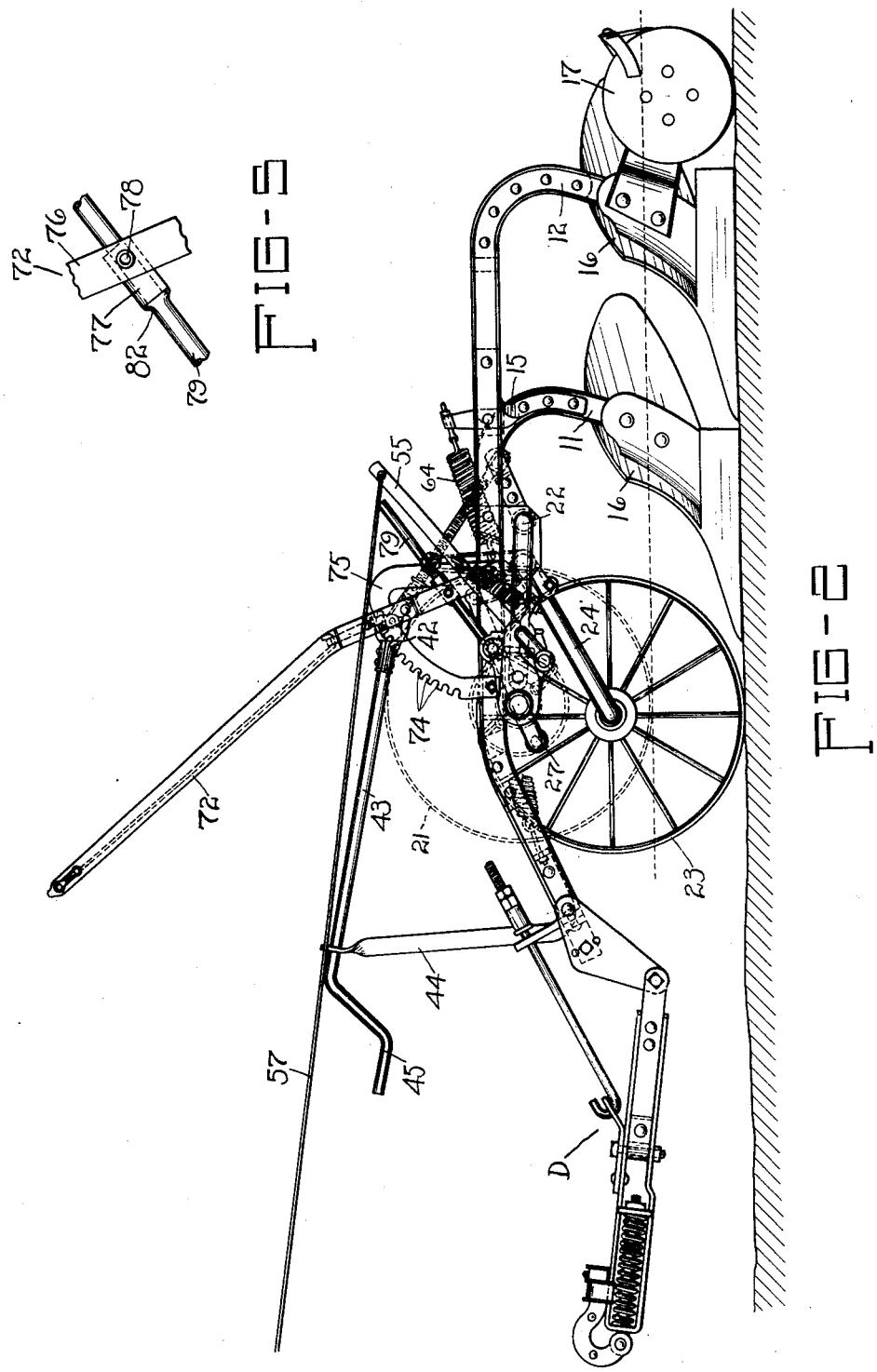
Fig. 2 is a side elevational view showing the implement in plowing position, the land wheel and clutch on the near side being illustrated in dotted lines to show the operating parts to better advantage.

The frame of the plow may be constructed in various ways, but in the preferred embodiment shown the two plow beams 11 and 12 make up the main structure of the frame. The front portions of these plow beams are connected by two right angle cross braces 13, and the rear portions of the beams are cross connected by two diagonal brace bars 14 and 15. The rear brace 15 preferably has both ends curved downwardly and riveted to the downwardly curved goose-neck portions of the two plow beams, as best illustrated in Figs. 1 and 2. The two plow bodies 16 are mounted on the lower ends of these goose-neck portions. A rear furrow wheel 17 is suitably mounted on the beam 12 to be disposed in rear of the rearmost plow body 16. The draft mechanism indicated generally at D is connected with the forward ends of the two plow beams 11 and 12.

The land wheel 21 is mounted on a crank axle 22 and the front furrow wheel 23 is mounted on a crank axle 24, the transverse portions of both crank axles extending transversely of the two frame beams 11 and 12 in proximity to each other and having bearing support in bracket plates 25 riveted to the plow beams and extending downwardly therefrom. The forwardly extending crank portion 22' of the land wheel crank axle 22 has a bracket casting 26 rigidly secured to the swinging end of said crank portion, and journaled in the end of this bracket member is a stub axle 27 on which the land wheel 21 is rotatably mounted.

Figure 4:
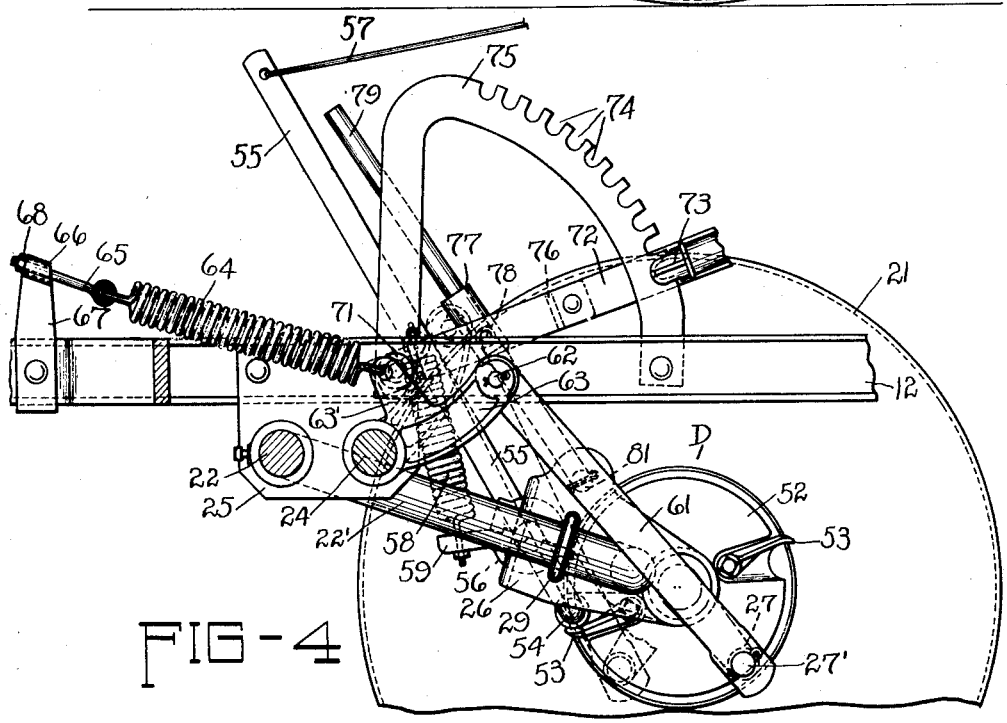
Fig. 4 is a view similar to Fig. 3 showing the position of these parts when the plow is lowered to its shallowest working depth.

As shown in Figs. 1 and 4, the bracket 26 is secured to the crank portion 22' of the axle by forming the adjacent face of the bracket with a groove in which the crank portion 22' lies, and by extending the outwardly turned end of said crank axle through a long socket in the bracket. A U-bolt 29 embraces the crank portion 22' and, passing through holes in the bracket 26, receives nuts on the other side thereof for securely clamping the crank portion 22' in the groove of the bracket. Such provides a simple and rigid attachment of the member 26 to the end of the crank portion 22'.

The furrow wheel 23 is shown as being journaled directly upon the outwardly turned spindle end of the other crank axle portion 24' (Fig. 1). Referring to Fig. 7, the two crank axles 22 and 24 are connected together at this furrowward side of the frame for concurrent lifting and lowering movement through a threaded shaft connection 31. Secured to the furrow wheel crank axle 24 is an arm 32, the attachment of said arm thereto being somewhat similar to the attachment of the bracket 26 to the other crank axle, viz., the downwardly extending portion of the arm 32 has a groove in its face in which the crank portion 24' of the axle is clamped by a U-bolt 33 embracing the crank portion 24' and extending through the lower portion of the arm 32. The threaded shaft 31 screws through a nut 34 which has rockable mounting at the upper end of the arm 32, such mounting being effected by providing the nut with oppositely extending trunnion pins 35 having bearing support in the upper end of the arm 32 and in a strap 36 secured to said arm.

The other axle 22 is provided with a rearwardly extending crank portion 22'' at this side of the frame. A sleeve 37 has like mounting on the swinging end of this crank portion, said sleeve having oppositely projecting trunnion pins pivotally mounted in the end of the crank portion and in a strap 38 riveted to the crank. The lower end of the threaded shaft 31 is rotatably mounted in the sleeve 37, and has a flanged shoulder 39 bearing against one end of said sleeve for transmitting thrust in one direction and has a collar 41 secured to its end bearing against the other end of said sleeve for transmitting thrust in the other direction. Referring to Fig. 2, the front end of the threaded shaft has connection through a suitable universal joint 42 with an operating rod 43 which extends forwardly and is loosely supported in an upwardly extending mounting bar 44, the rod being capable of inclining and sliding in said bar. A crank 45 on the front end of said rod is disposed in position for convenient actuation by the operator from his position on the tractor. As will be understood by those skilled in the art, actuation of the crank 45 will be operative to level the plow by swinging the crank axle 24 relatively to the crank axle 22 and thereby raising or lowering the furroward side of the frame. The use of the threaded shaft 31 is advantageous in that it reduces the effort required to level the plow, it enables relatively fine adjustments to be obtained, and it is self-locking in any adjusted relation. As before stated, this threaded shaft connection also compels both crank axles and their respective wheels to swing simultaneously in the operation of lifting the plow to transport position or lowering the plow to plowing position.

When the implement is raised to transport position, the crank axle portion 22' is prevented from swinging backwardly beyond a predetermined lifting angle by the engagement of the other crank arm portion 22'' with a stop 47 on the other side of the frame. As best shown in Figs. 1 and 7, this stop is preferably constructed by taking a bar or strap of metal and bending the intermediate portion outwardly and then back upon itself to form the outwardly projecting stop portion 47. The end portions of this bar 48 are then riveted or bolted to the adjacent beam 11. The usual counterbalancing spring 49 (Fig. 1) may be connected, if desired, with the upwardly extending portion of the arm 32, such spring aiding in lifting the implement by counterbalancing a part of the weight thereof, as is well understood.

Referring now to the arrangement of the power lift and depth adjusting mechanism, as best shown in Figs. 3 and 4, it will be seen that the stub axle 27 is extended inwardly beyond the bracket 26 and is bent laterally to form a crank portion terminating in a crank pin 27' through which lifting motion is transmitted between the frame and the crank axle 22'. Mounted on said stub axle between the land wheel 21 and the bracket 26 is a power lift clutch C comprising the driving and driven elements 51 and 52, respectively. The driving element rotates continuously with the land wheel, and the driven element is adapted to be rotated through successive half revolutions through the instrumentality of clutching mechanism interposed between these elements.

This general type of half revolution lift clutch is old and well known, one form thereof being disclosed in my Reissue Patent No. 15,828, reissued April 29, 1924, and, hence, a detail description of this clutch will not be necessary. It will suffice to say that the clutching parts acting between the driving and driven elements are tripped through the action of two diametrically opposite pawls or dogs 53 carried by the driven clutch element 52. The clutch is released by the engagement of a roller 54 with either of said dogs, such roller being mounted on the lower swinging end of a tripping lever 55. This lever is pivotally supported at 56 on the bracket casting 26, and extending forwardly from the upper end of said lever is a rope 57 by which the operator can trip the lever 55 from his position on the tractor when the clutch is to be engaged. A tension spring 58 is connected between said lever and a lug 59 projecting from the bracket 26, the action of said spring being to swing the roller 54 into the path of one of the dogs 53 and hold it in clutch releasing engagement with said dog for locking the driven clutch element in a predetermined angular position. The tripping of the lever 55 swings the roller 54 outwardly away from the position shown, thereby permitting the clutch to engage and to rotate through a half revolution or until the next dog 53 engages the roller end of the tripping lever, which has previously been restored to normal position, such engagement of the succeeding dog with the roller releasing the clutch and locking the driven element thereof in predetermined angular relation to the bracket 26.

The land wheel 21 rotates freely on the stub axle 27, but the driven clutch element 52 is secured fast to said stub axle so that when the clutch is engaged the crank pin 27' will revolve with the clutch.

A thrust bar 61 is pivotally mounted at its lower end on said crank pin 27', and at its upper end is pivotally connected at 62 in the bifurcated end of an arm 63 which is mounted for free swinging movement on the transverse portion of the crank axle 24. The thrust bar 61 and arm 63 are preferably disposed on the inner side of the frame beam 12. A lug or extension 63' projects from the arm 63 and has a tension spring 64 hooked thereto, normally tending to swing the arm 63 in a counterclockwise direction, as viewed in Figs. 3 and 4. The other end of said spring is hooked to a bolt 65 which passes through a sleeve 66 formed on the upper end of a bracket 67. By adjusting a nut 68, which screws over this bolt and bears against the back of said bracket, the tension of the spring 64 can be adjusted.

The upward and backward movement of the arm 63 is limited by its engagement with a stop projection 71 extending inwardly from the side of the frame beam 12. The particular purpose of this stop, and the coaction of the swinging arm 63 and spring 64 with the thrust bar 61 will be later described in the general description of the operation of the device.

I shall now describe the mechanism by which the depth adjustments of the plow are established. A depth adjusting lever 72 is pivotally mounted on the plow frame at any suitable point, being shown as pivotally mounted on the bolt which secures the stop 71 to the plow beam 12. Said lever carries any suitable grip released latching dog 73 adapted to engage in the teeth 74 of a latching quadrant 75 which is also suitably secured to the frame beam 12. Secured to one side of the lever 72 is a strap 76, and pivotally mounted between the lever and said strap is a sleeve 77. The sleeve has trunnion pins 78 projecting from opposite sides thereof and having bearing support in the lever and strap, and it will be noted from Figs. 4 and 5 that the axis of these two trunnion pins is located closer to one end of the sleeve 77 than to the other. Passing through said sleeve is a rod or bar 79 which is pivotally connected at its lower end at 81 to the bracket 26 on which the land wheel is mounted. The upper portion of the rod 79 can slide downward freely through the sleeve 77 when the crank axle 22 is rocked in a plow lifting operation, but upward movement of the rod through the sleeve is limited by an annular enlarged shoulder 82 on the rod, which is adapted to engage the adjacent end of the sleeve. When it is desired to adjust the plow for shallow plowing, the lever 72 is moved downwardly toward or into the position illustrated in Fig. 4, such acting through the engagement of the sleeve 77 with the shoulder 82 to thrust downwardly on the rod 79 and swing the crank axle 22' in a rearward direction, thereby elevating the plow to the desired depth adjustment.

Lowering the plow to a greater plowing depth is accomplished by swinging the lever 72 upwardly, into or toward the position illustrated in Fig. 3, which allows the rod 79 to move upwardly, thereby allowing the crank axle 22' to swing rearwardly and permitting the plow frame to lower. The depth adjusting movements thus given the crank axle 22' are correspondingly transmitted to the other crank axle 24' through the threaded shaft 31 so that the land and front furrow wheels are given corresponding depth adjustments.

It will be noted that the shoulder 82 and the adjacent end of the sleeve 77 constitute two stops of a lost motion connection between the lever 72 and the rod 79. The construction disclosed provides for adjustment of the two stops between said lever and said rod, whereby the range of depth adjustment may be varied. This is accomplished by disconnecting the rod 79 from the bracket 26 by releasing the pivotal connection 81, then withdrawing the rod from the sleeve 77, and then revolving the sleeve to substitute one end for the other as a stop member (Fig. 5), the space between the lever 72 and the strap 76 being of sufficient dimensions to permit the sleeve 77 to be turned over in this manner. When the rod 79 is re-inserted in the sleeve and is pivotally coupled to the bracket 26, a different angular relation is established between the lever 72 and the crank axle 22'. Such adjustment enables one or the other of the limits of depth adjustment to be shifted so as more readily to adapt the plow to shallow plowing or to deep plowing.

Referring now to the power lift operation and assuming that the depth adjusting lever 72 has been moved to the uppermost sector notch 74 for maximum plowing depth, it will be seen from Fig. 3 that the arm 63 is either contacting with the stop 71 or is in immediate proximity thereto. Hence, when the clutch tripping lever 55 is actuated, the resulting downward and backward oscillation transmitted to the crank pin 27' from the land wheel 21 will react up through the thrust bar 61 to the pivot 62 in substantially the same manner as if this pivot were fixedly mounted on the frame. The upward thrust transmitted through the bar 61 will rock the crank axle 22' in a downward and rearward direction, thereby raising the plow frame until the next succeeding clutch dog 53 engages the tripping roller 54. When this occurs, the crank pin 27' will occupy a position substantially diametrically opposite to the position shown in Fig. 3 with respect to the bracket 26, and the locked relation of the driven clutch element will hold the plow in raised position. Such rocking movement of the crank axle 22' has been transmitted through the threaded shaft 31 to the other crank axle 24' so that the plow has also been raised with respect to the front furrow wheel. When the crank axle 22' has been swung back through the full range of plow lifting movement, the arm 22" on the other end of this crank axle (Fig. 7) has moved into contact with, or into proximity to, the stop 47, so that the crank portion 22' is prevented from swinging into or beyond a vertical position.

This insures that the weight of the plow will be effective to lower the same when the lift clutch is again tripped. When the plow is in this raised position, the relation of the crank pin 27' to the lifting or thrust bar 61 is such that the weight of the plow acting through this thrust bar tends to rotate the crank pin forwardly in the direction of rotation of the land wheel. Hence, when the clutch tripping lever 55 is again actuated to release the locked relation of the driven clutch element, the crank pin 27' swings forwardly and downwardly and the plow drops under its own weight to the ground. In the interval during which the plow bottoms are entering the ground, the crank pin 27' may revolve forward and downward faster than the plow frame is lowering, but such merely acts through the lifting bar 61 to pull the arm 63 away from the stop 71 against the tension of the spring 64, until the plow bottoms have moved down to their predetermined depth adjustment, determined by the engagement of the shoulder 82 against the end of the sleeve 77, at which time the arm 63 has been returned into contact with, or into proximity to, the stop 71.

When the depth adjusting lever 72 is swung down to the position illustrated in Fig. 4, corresponding to the shallowest plowing depth, the lifting bar 61 is pulled downwardly, thereby drawing the arm 63 away from the stop 71 against the tension of the spring 64. This spring tension creates an upward pull through said lifting bar and acting on the crank pin 27'.

Consequently, when the clutch tripping lever 55 is actuated with the plow at this depth adjustment, the rotative force of the land wheel and the tension of the spring 64 both act to swing the crank pin backwardly and upwardly. The clutch C is of a type in which the driven element 52 can race ahead of the driving element 51 under the tension of the spring 64. The detail construction of these half revolution, power lift clutches is old and well known, a representative form thereof being disclosed, for example, in my Reissue Patent No. 15,828, reissued April 29, 1924. The tension of the spring 64 is sufficient to overcome the tendency of the clutch roller within the clutch from remaining in one of the driving notches of the driving clutch element, so that the driven clutch element is raced ahead of the driving clutch element as soon as the clutch is tripped. Consequently, the pivoted arm 63 is brought up against the stop 71 almost immediately, as indicated in dotted lines in Fig. 4. From this point on, the actual lifting of the plow occurs, the thrust bar 61 then having a fixed point against which it can react for swinging the crank axle 22' rearwardly. By this function of the spring 64 in racing the driven clutch element ahead and immediately bringing the pivoted arm 63 up against the stop 71, there is no loss of time incident to initiating the actual lifting operation, such as would otherwise be present if the arm 63 had to be moved gradually up into engagement with the stop 71. Thus, in the two depth adjustments illustrated in Figs. 3 and 4, and in all intermediate adjustments, the initiation of the lifting operation occurs almost instantly with the tripping of the clutch, so that no time is lost in bringing the plow bottoms up out of the ground.

This enables the plowing operation to be carried up closer to the fence line at the end of the field.

Attention is also directed to the fact that the height of lift is substantially the same, irrespective of the depth adjustment at which the plow has been operating. The train of parts comprising the stop member 71, the swinging arm 63 and the thrust bar 61 constitute, in effect, a lost motion connection between the crank pin 27' and the plow frame, through which the lifting effort is transmitted. The pivoted arm 63 constitutes a stop member moving with the lifting bar 61 and adapted to engage the fixed stop member 71 in this lost motion connection. The lost motion between these stop members accommodates different depth adjustments, but the lifting operation is dependent upon engagement between these stop members, which always insures the same height of lift to transport position irrespective of the plowing depth. This prevents the possibility of the plow bottoms failing to clear obstructions when lifted at the end of the field from a deep plowing depth.

While I have shown what I regard to be the preferred embodiment of my invention, nevertheless it will be understood that such embodiment is merely exemplary and that numerous modifications and rearrangements may be made without departing from the essence of the invention. For example, while it is desirable to provide the spring 64 for rapidly swinging the moving stop member 63 up against the stationary stop member 71, such spring may be omitted and numerous advantages still retained in the construction disclosed.

I claim:—

1. A power lift plow comprising a frame, ground wheels supporting said frame for lifting movement, depth adjusting means, lifting means including a clutch driven from one of said wheels, a lifting member operatively connected with said clutch and adapted to be moved in one direction by said clutch for lifting the plow, spring means adapted to cause movement of said lifting member in the same direction, and means by which said lifting member is operatively connected with the frame.

2. A power lift plow comprising a frame, ground wheels supporting said frame for lifting movement, depth adjusting means, lifting means including a clutch driven from one of said wheels, a lifting member operatively connected with said clutch, a stop member moving with said lifting member and adapted to engage a cooperating stop member for effecting lifting movement of said plow, and spring means normally tending to move said stop members into engagement.

3. A power lift plow comprising a frame, ground wheels supporting said frame, a crank axle for one of said ground wheels, depth adjusting means, lifting means for swinging said crank axle to lift the plow, including a clutch driven from one of said wheels, a lifting bar operatively connected with the frame and with said clutch and adapted to be moved in one direction by said clutch for lifting the plow, and spring means adapted to actuate said lifting bar in its plow lifting direction of movement when said clutch is tripped for raising the plow.

4. A power lift plow comprising a frame, ground wheels supporting said frame for lifting movement, depth adjusting means, lifting means including a clutch driven from one of said wheels, a lifting member operatively connected with said clutch, fixed stop means carried on said frame and stop means moving with said lifting member and adapted to engage with said fixed stop means carried on said frame, said two stop means being separated at certain plowing depths, and spring means normally tending to move said two stop means into engagement.

5. A power lift plow comprising a frame, a swinging crank axle connected with said frame, a ground wheel journaled on said crank axle, depth adjusting means, a clutch swinging with said crank axle and driven by said ground wheel, a lifting bar operatively connected with said clutch, stop means carried on said frame, stop means pivotally connected with the frame and moved by said lifting bar into engagement with the stop means carried on said frame, said two stop means being separated at certain plowing depths, and spring means normally tending to move said two stop means into engagement.

6. A power lift plow comprising a frame, a swinging crank axle connected with said frame, a ground wheel journaled on said crank axle, depth adjusting means, a clutch swinging with said crank axle and driven by said ground wheel, a lifting bar operatively connected with said clutch, a fixed stop mounted on said frame, a pivoted stop arm adapted to be moved by said lifting bar into engagement with said fixed stop, and spring means normally tending to move said stop arm into engagement with said fixed stop.

7. A power lift plow comprising a frame, ground wheels supporting said frame for lifting movement, depth adjusting means, and power lift means for raising the plow substantially to the same height irrespective of the setting of said depth adjusting means, said power lift means comprising a clutch driven from one of said ground wheels, lifting mechanism operatively connected with said clutch and comprising two members adapted to contact with each other in the plow lifting operation, one of said members separating from the other in one adjustment of said depth adjusting means, and spring means operative to move said members into contact when said clutch is tripped for lifting the plow.

8. A power lift plow comprising a frame, ground wheels supporting said frame for lifting movement, depth adjusting means, and power lift means for raising the plow substantially to the same height irrespective of the setting of said depth adjusting means, said power lift means comprising a clutch driven from one of said ground wheels, said clutch comprising driving and driven clutch elements, a lifting member operatively connected with said driven clutch element and with said frame and adapted to effect lifting of the plow, and spring means cooperating with said lifting member for causing said driven clutch element to move faster than said driving clutch element when said clutch is tripped for a plow lifting operation from a shallow adjustment of said depth adjusting means.

9. A power lift plow comprising a frame, a crank axle pivotally connected with said frame, a ground wheel journaled on said crank axle, depth adjusting means, a power lift clutch driven from said ground wheel, a thrust bar actuated by said clutch, a stop member mounted on said frame, and means actuated by said thrust bar and movable into and out of engagement with said stop member, through which the lifting effort of the clutch is transmitted.

10. A power lift plow comprising a frame, a crank axle pivotally connected with said frame, a ground wheel journaled on said crank axle, depth adjusting means coacting with said axle and wheel, a power lift clutch driven from said ground wheel and adapted to swing with said crank axle, a thrust bar actuated by said clutch, a stop member fixedly mounted on said frame, and an arm pivotally mounted on said frame and moved by said thrust bar into and out of engagement with said stop member.

11. A power lift plow comprising a frame, a crank axle pivotally connected with said frame, a ground wheel journaled on said crank axle, a power lift clutch operatively connected to swing said crank axle for lifting the plow, a rod operatively connected with said crank axle, a lever for establishing depth adjustments through said rod, a sleeve carried by said lever and through which said rod passes, and a stop on said rod adapted to engage said sleeve, said sleeve being reversible end for end relatively to said lever for changing the depth adjusting range of said lever.

12. A power lift plow comprising a frame, a crank axle pivotally connected with said frame, a ground wheel journaled on said crank axle, a power lift clutch driven by said ground wheel and swinging with said crank axle, a lifting bar actuated by said clutch for lifting the plow, a rod pivotally connected with the swinging portion of said crank axle, a lever for establishing depth adjustments through said rod, and a lost motion connection between said rod and said lever.

13. A power lift plow comprising a frame, a crank axle pivotally connected with said frame, a ground wheel journaled on said crank axle, a power lift clutch operatively connected with the frame to swing said crank axle for lifting the plow, a depth adjusting lever, mechanism operatively connecting said lever with said crank axle for establishing depth adjustments, said mechanism including means connected with said lever for lengthening or shortening the distance between said lever and said crank axle during plowing so as to vary the depth adjusting range of said lever.

14. A plow comprising a frame, a crank axle pivotally connected with said frame, a ground wheel journaled on said crank axle, a rod operatively connected with said crank axle, a lever for establishing depth adjustments through said rod, a sleeve carried by said lever and through which said rod passes, a shoulder on said rod adapted to engage one end of said sleeve, and means pivotally mounting said sleeve on said lever on an axis located closer to one end of said sleeve than to the other whereby said sleeve may be reversed end for end to change the depth adjusting range of said lever.

15. A plow comprising a frame, a crank axle pivotally connected with said frame, a ground wheel journaled on the crank portion of said axle, power lift mechanism associated with said ground wheel and operative to rock said axle for lifting the plow, an arm extending from said crank axle, and a stop mounted on said frame and adapted to be engaged by said arm for preventing the crank portion of said axle from swinging beyond a substantially vertical position, said stop comprising a bar having its ends secured to said frame and having its intermediate portion folded outwardly and back upon itself to form the stop.

16. In a power lift plow comprising a frame, crank axle supported ground wheels therefor, and lifting means for swinging the cranks relatively to the frame, including a thrust bar and a half revolution clutch optionally operable by one of the ground wheels to actuate said thrust bar, the combination with such lifting means, of a pivotally mounted swinging lever connected with said thrust bar and the frame so as to be swung by the thrust bar, and stop means on the frame for limiting the swinging movement of said lever caused by the thrust bar, said lever operating to transmit the lifting force of the thrust bar to the frame through said last named means.

17. In a power lift plow comprising a frame, crank axle supported ground wheels therefor, and lifting means for swinging the cranks relatively to the frame, including a thrust bar and a half revolution clutch optionally operable by one of the ground wheels to actuate said thrust bar, the combination with such lifting means, of a pivotally mounted lever connected with said thrust bar and with the frame, and a fixed stop stationarily mounted on said frame and positioned to contact said lever intermediate its ends for limiting the movement of said lever, said lever operating to transmit the lifting force of the thrust bar to the frame through said last named means.

18. In a power lift plow comprising a frame, land and furrow wheels for supporting said frame, a crank axle for said land wheel, and lifting means for swinging said crank axle relatively to the frame, including a half revolution clutch mounted concentrically of said land wheel and operable thereby, and a thrust bar actuated by said half revolution clutch, the combination with such lifting means, of a pivotally mounted member connected with said thrust bar and frame and adapted to be swung by said bar, and a fixed stop mounted on the frame for limiting the swinging movement of said pivotally mounted member, said latter member operating to transmit the lifting force of the thrust bar to the frame through said fixed stop.

19. A power lift plow comprising a frame, crank axles pivotally journaled therewith, ground wheels supporting said frame and journaled on said axles, depth adjusting means, leveling means connected with said axles for adjusting the plow relative to said two wheels and for transmitting rocking movement between said axles, power lift means for rocking one of said axles and thereby raising the plow to substantially the same height irrespective of the setting of said depth adjusting means, said power lift means comprising a clutch driven from one of said ground wheels, lifting mechanism operatively connected with said clutch by a thrust bar and comprising two members adapted to contact with each other in the plow lifting operation and to be separated during some adjustments of the depth adjusting means, and spring means operative to normally contact said two members with each other when said clutch is tripped for lifting the plow.

20. A power lift plow comprising a frame, crank axles pivotally mounted thereon, a land wheel journaled with one of said crank axles and a furrow wheel on the other, depth adjusting means, and power lift means for raising the plow substantially to the same height irrespective of the setting of said depth adjusting means, said power lift means comprising a clutch driven from said land wheel, a thrust bar pivotally connected therewith, a swinging lever pivotally connected with the frame and with the thrust bar, stop means connected with the frame for limiting the movement of said lever, said lever operating to transmit the lifting force of the thrust bar to the frame through said last named means when said clutch is tripped for lifting the plow thereby rocking said land wheel crank axle, and means connected with and between said crank axles for transmitting said rocking movement of said land wheel axle to the other of said axles whereby both of said wheels lower substantially concurrently in raising the plow to said same height irrespective of the setting of said depth adjusting means and for effecting leveling adjustments of the plow.

21. A power lift plow comprising a frame, crank axles pivotally mounted thereon, a land wheel journaled with one of said crank axles and a furrow wheel on the other, motion transmitting mechanism for effecting plow leveling adjustments between said crank axles, depth adjusting means, and power lift means for raising the plow substantially to the same height irrespective of the setting of said depth adjusting means, said power lift means comprising a clutch driven from said land wheel, a thrust bar pivotally connected therewith, a swinging lever pivotally connected with the frame and with the thrust bar, fixed stop means connected with the frame for limiting the movement of said lever, said lever operating to transmit the lifting force of the thrust bar to the frame through said last named means when said clutch is tripped for lifting the plow by rocking said land wheel crank axles, and said motion transmitting mechanism connected with and between said crank axles transmitting said rocking movement of said land wheel axle to the other of said axles whereby both of said wheels lower substantially concurrently in raising the plow to said same height irrespective of the setting of said depth adjusting means.

22. A plow comprising a frame, a crank axle having a crank and a horizontal portion and being pivotally connected with said frame at said horizontal portion, a ground wheel journaled on the crank portion of said axle, power lift mechanism associated with said ground wheel and operative after being tripped to rock said axle for lifting the plow, an arm extending from said horizontal portion, and a stop connected with said frame and adapted to be engaged by said arm for preventing the crank portion of said axle from swinging into or beyond a vertical position during plow lifting by said lift mechanism to thereby enable the weight of the plow to lower the same when the lift mechanism is again tripped.

23. A power lift plow comprising a frame, a crank axle pivotally connected with said frame, a ground wheel journaled on said crank axle, a power lift clutch driven by said ground wheel and swinging with said crank axle, a lifting bar actuated by said clutch for lifting the plow, a stop connected with said frame through which lifting force of the lifting bar is transmitted to said frame, a lost motion connection between said lifting bar and said frame, a rod pivotally connected with the swinging portion of said crank axle, a lever for establishing adjustments through said rod, and a lost motion connection between said rod and said lever.

24. A power lift plow comprising a frame, wheels supporting the frame for lifting movement, depth adjusting means, means including a clutch driven from one of said wheels for lifting the plow, a thrust bar operatively connected with said clutch, a stop member moving with said bar, a stop on the frame, said moving stop member being adapted to engage said stop on the frame for effecting lifting movement of the plow, and means normally tending to move said stops into engagement.

25. A power lift plow comprising a frame, a swinging crank axle connected with the frame, a ground wheel on said axle, depth adjusting means, lifting means including a clutch swinging with said axle and driven by said wheel, and a lost motion connection between the clutch and the frame comprising, a lifting member operatively connected with the clutch and having stop means, and stop means on the frame adapted to be engaged by the lifting member stop means, and means normally tending to take up said lost motion.

26. A power lift plow comprising a frame, crank axles pivotally journaled therewith, ground wheels supporting said frame and journaled on said axles, depth adjusting means, leveling means connected with said axles for adjusting the plow relative to said two wheels and for transmitting rocking movement between said axles, and power lift means operative for rocking one of said axles and thereby raising the plow substantially the same height irrespective of the setting of said depth adjusting means, said power lift means including a clutch driven from one of said wheels and a lost motion connection between the clutch and the frame.

27. A power lift plow comprising a frame, crank axles pivotally journaled therewith, ground wheels supporting said frame and journaled on said axles, depth adjusting means, leveling means connected with said axles for adjusting the plow relative to said two wheels and for transmitting rocking movement between said axles, power lift means operative for rocking one of said axles and thereby raising the plow to substantially the same height irrespective of the setting of the depth adjusting means, said power lift means including a clutch driven from one of said wheels and a lost motion connection between the clutch and the frame, and means operative to normally take up said lost motion.

28. A power lift plow comprising a frame, ground wheels supporting said frame for lifting movement, depth adjusting means, a power lift clutch driven from one of said wheels comprising driving and driven clutch elements, plow lifting means actuated by said clutch comprising, a lifting member actuated by said driven clutch element, a lost motion connection between said member and the frame for accommodating different depth adjustments of the plow and transmitting lifting effort to the frame from the clutch for raising the plow to substantially the same height irrespective of the setting of the depth adjusting means, and means for causing said driven clutch element to move faster than said driving clutch element when said clutch is tripped for a plow lifting operation to take up said lost motion connection thereby initiating the lifting operation substantially instantly the clutch is tripped.

29. A power lift plow comprising a frame, ground wheels supporting said frame for lifting movement, depth adjusting means, power lift means for raising the plow substantially to the same height irrespective of the setting of said depth adjusting means, said power lift means comprising a clutch driven from one of said ground wheels, a lifting member operatively connected with said clutch and adapted to be moved in one direction thereby for lifting the plow, lost motion means connecting said lifting member with the frame for accommodating different depth adjustments of the plow and for transmitting lifting effort for raising the plow, and spring means for taking up said lost motion when the clutch is tripped for causing the lifting of the plow to begin substantially immediately upon the tripping of the clutch from substantially any plowing depth.

30. A power lift plow comprising a frame, crank axle supported ground wheels therefor, lifting means for swinging the cranks relatively to the frame, including a thrust bar and a half revolution clutch optionally operable by one of the ground wheels to actuate said thrust bar, a lost motion connection between said thrust bar and the frame and embodying means establishing a definite limit to the free relative movement between the thrust bar and frame.

31. In a power lift plow comprising a frame, crank axle supported ground wheels therefor, depth adjusting means, and lifting means for swinging the cranks relatively to the frame, including a thrust bar and a half revolution clutch optionally operable by one of the ground wheels to actuate said thrust bar, the combination therewith, of a lost motion connection between said thrust bar and the frame for accommodating different depth adjustments of the plow and transmitting lifting effort to the frame for raising the plow to substantially the same height irrespective of the setting of the depth adjusting means.

32. A plow comprising a frame, two crank axles pivotally connected with said frame, two ground wheels journaled on said crank axles, power lift mechanism associated with one of said ground wheels and operative to rock one of said crank axles to lift the plow, depth adjusting mechanism pivotally connected with one of said crank axles independently of said power lift mechanism and including means for changing the depth adjusting range of said mechanism, and motion transmitting mechanism for transmitting rocking movement from said latter axle to the other of said axles, said motion transmitting mechanism comprising screw threaded means for effecting plow leveling adjustments between said crank axles.

33. A plow comprising a frame, two crank axles pivotally connected with said frame, two ground wheels journaled on said crank axles, power lift mechanism including a half revolution clutch associated with one of said crank axles, a link connected with said clutch and adapted to have thrust reaction with the frame in one direction only to rock said latter crank axle to lift the plow, depth adjusting means operatively connected with said latter crank axle independently of said link, and mechanism for transmitting rocking movement between said axles comprising arms extending from each of said axles, a threaded nut pivotally supported on one of said arms, a threaded shaft screwing through said nut, a sleeve pivotally supported on the other of said arms, said shaft being rotatably supported in said sleeve and held against endwise movement therein, and means for rotating said threaded shaft.

34. A plow comprising a frame, a crank axle pivotally connected with said frame, a front furrow wheel and a land wheel, one of said wheels being journaled on said crank axle, plow lifting means associated with the other of said wheels including a pivotally mounted thrust link, depth adjusting means operable independently of said thrust link to regulate the depth of plowing, and mechanism for transmitting movement between said plow lifting means and said crank axle, said mechanism comprising screw threaded means for effecting leveling adjustments of the plow relatively to said two wheels.

35. A plow comprising a frame, two crank axles pivotally connected with said frame, two ground wheels journaled on said crank axles, power lift mechanism associated with one of said ground wheels and operative to rock one of said crank axles to lift the plow, and depth adjusting mechanism including means for changing the depth adjusting range thereof and a sliding lost motion connection operatively connected with one of said crank axles independently of said power lift mechanism.

36. A plow comprising a frame, two crank axles pivotally connected with said frame, two ground wheels journaled on said crank axles, power lift mechanism including a half revolution clutch associated with one of said crank axles, a link connected with said clutch and adapted to have thrust reaction with the frame in one direction only to rock said latter crank axle to lift the plow, and depth adjusting means comprising an adjustable lost motion connection operatively connected with said latter crank axle independently of said link.

CARL G. STRANDLUND.